(12) United States Patent
Nagata et al.

(10) Patent No.: US 11,921,025 B2
(45) Date of Patent: Mar. 5, 2024

(54) FLUID MONITORING SYSTEM

(71) Applicant: Nikon Corporation, Tokyo (JP)

(72) Inventors: Takashi Nagata, Castro Valley, CA (US); Ting-Chien Teng, Fremont, CA (US); Yohei Konishi, Tokyo (JP); Kiyoshi Nozaki, Sagamihara (JP)

(73) Assignee: Nikon Corporation (JP)

( * ) Notice: Subject to any disclaimer, the term of this patent is extended or adjusted under 35 U.S.C. 154(b) by 88 days.

(21) Appl. No.: 17/616,931

(22) PCT Filed: Jun. 25, 2020

(86) PCT No.: PCT/US2020/039500
§ 371 (c)(1),
(2) Date: Dec. 6, 2021

(87) PCT Pub. No.: WO2021/137892
PCT Pub. Date: Jul. 8, 2021

(65) Prior Publication Data
US 2022/0307963 A1    Sep. 29, 2022

Related U.S. Application Data

(60) Provisional application No. 62/870,355, filed on Jul. 3, 2019.

(51) Int. Cl.
*G01N 15/06* (2006.01)
*G01N 11/04* (2006.01)

(52) U.S. Cl.
CPC ......... *G01N 15/0618* (2013.01); *G01N 11/04* (2013.01)

(58) Field of Classification Search
CPC .................. G01N 15/0618; G01N 11/04
See application file for complete search history.

(56) References Cited

U.S. PATENT DOCUMENTS

2005/0118220 A1 *  6/2005  Miyazaki ............ A61Q 1/12
                                                    424/401

FOREIGN PATENT DOCUMENTS

| AU | 701603 B2 | * | 4/1995 | |
| CN | 109952277 A | * | 6/2019 | ............ C03B 3/00 |
| EP | 1541115 A1 | * | 6/2005 | ......... A61K 8/0275 |
| JP | 4 038587 B2 | | 1/2008 | |
| JP | 4038587 B2 | * | 1/2008 | |
| JP | 5186806 B2 | * | 4/2013 | ............ G03G 5/056 |

OTHER PUBLICATIONS

JP-4038587-B29-translate (Year: 2008).*
CN-109952277-A-translate (Year: 2019).*

(Continued)

*Primary Examiner* — Kristina M Deherrera
*Assistant Examiner* — Fatemeh Esfandiari Nia
(74) *Attorney, Agent, or Firm* — ROEDER & BRODER LLP; Steven G. Roeder (57) ABSTRACT

A slurry analysis system (14) for estimating a first characteristic of a slurry (12) having a plurality of particles (18) suspended in a dispersion medium (20) can include a slurry filter (40) that filters the slurry (12); and a control system (26) that estimates the first characteristic of the slurry (12) using a flow rate of a filtrate (50) through the slurry filter (40) and a slurry filtration pressure of the slurry (12).

13 Claims, 5 Drawing Sheets

(56) References Cited

OTHER PUBLICATIONS

JP-5186806-B2-translate (Year: 2013).*
EP-1541115-A1-translate (Year: 2005).*
AU-701603-B2-translate (Year: 1999).*
Bertei, Antonio, Benedetta Nucci, and Cristiano Nicolella. "Effective transport properties in random packings of spheres and agglomerates." Chemical Engineering Transactions 32 (2013): 1531-1536. (Year: 2013).*
Malvern Instruments Limited, "Basic principles of particle size analysis". Dec. 31, 2014. https://www.atascientific.com.au/wp-content/uploads/2017/02/AN020710-Basic-Principles-Particle-Size-Analysis.
Zhang Zehao et al, "The solid-liquid separation behaviors of the typical leach slurries in the alkaline processes for alumina." Hydrometallurgy, Elsevier Scientific Publishing CY. Amsterdam, NL., vol. 169, pp. 229-238, Feb. 3, 2017.
Tuve Mattsson et al., "Zeta-potential and local filtration properties: Constitutive relationships from Ti0from experimental filtration measurements." Chemical Engineering Science. Oxford, GB, vol. 66, No. 20, pp. 4573-4581, Jun. 12, 2011.
International Search Report and Written Opinion for PCT application No. PCT/US2020/039500, issued by ISA/European Patent Office, dated Sep. 10, 2020.

\* cited by examiner

FLUID MONITORING SYSTEM

RELATED APPLICATIONS

This application claims priority on U.S. Provisional Application No. 62/870,355 filed on Jul. 3, 2019, and entitled "FLUID MONITORING SYSTEM". As far as permitted, the contents of U.S. Provisional Application No. 62/870,355 are incorporated in their entirety herein by reference.

BACKGROUND

Manufacturing fluids, such as slurries, are used in many manufacturing processes. For example, an abrasive particle slurry can be used to polish a workpiece, such as a lens. In this example, the abrasive particle slurry can be an aqueous solution that carries a high concentration of nanoscale abrasive particles. The abrasive particle slurry can play a number of critical roles in the polishing of the workpiece. For example, the chemical composition of the abrasive particle slurry can alter the surface properties of the workpiece, soften the workpiece surface and make it amenable to material removal. Further, the abrasive particles in the abrasive particle slurry can remove material from the workpiece surface by cutting nanoscale grooves in the workpiece surface. As a result thereof, the composition of the abrasive particle slurry can significantly influence the quality of the polishing of the workpiece.

In another example, a ceramic casting slurry can be used in a ceramic mold casting to form an object. In this example, the composition of the ceramic casting slurry will again significantly influence the quality of the object.

Accordingly, it is important to monitor the composition of the slurry during the manufacturing process. One method to analyze the slurry is with optics-based particle detection techniques. However, because of the high particle concentrations of the slurries, it is difficult to optically analyze the slurry without aggressively diluting the slurry. Stated in another fashion, the optics-based particle detection techniques suffer from the shortcoming where light cannot probe into slurries at high particle concentrations at which the slurries are most useful. Thus, pre-manipulation such as dilution becomes a necessary conventional practice.

Unfortunately, the dilution of the slurry can alter the key properties of the slurry that are being monitored before they can be properly detected and measured. This compromises the integrity of the measurements taken on the slurry, and renders the monitoring results less suitable for representing the original slurry before manipulation. Further, optics-based particle detection techniques are expensive to make and operate.

The lack of good, inexpensive monitoring methods for the slurry results in flawed management and control of the quality of the slurry, as well as a higher cost of fluid manufacturing. Accordingly, there is a need for an analysis system that accurately analyzes the slurry.

SUMMARY

The present invention is directed to a slurry analysis system for estimating a first characteristic of a slurry that includes a plurality of particles suspended in a dispersion medium. The slurry analysis system can include a slurry filter that filters the slurry; and a control system that estimates the first characteristic of the slurry using a flow rate of a filtrate through the filter and a slurry filtration pressure of the slurry.

As an overview, the present slurry analysis system is designed to analyze the slurry at ready-to-use conditions, and without diluting the slurry. This greatly simplifies the analysis and enables accurate monitoring of slurry as well as processes for fluid synthesis.

The slurry filter can pass the dispersion medium and block the particles. Further, the control system can estimate the first characteristic of the slurry also using one or more of (i) a nominal particle property of the particles; (ii) a cake thickness of a cake layer against the filter; and (iii) a viscosity of the dispersion medium. In one embodiment, the control system can estimate the first characteristic of the slurry also using (i) a nominal particle property of the particles; (ii) a cake thickness of a cake layer against the filter; and (iii) a viscosity of the dispersion medium.

As provided herein, the first characteristic can be a cake particle packing fraction of the slurry. Further, the control system can estimate the cake particle packing fraction of the slurry using the following formula:

$$\frac{\emptyset c^2}{(1-\emptyset c)^3} = \frac{P}{5S_v^2}\frac{dt}{dV}\frac{1}{L},$$

wherein (i) Øc is the cake particle packing fraction of the slurry; (ii)

$$\frac{dt}{dV}$$

is the inverse of the flow rate of the filtrate through the slurry filter; (iii) P is the slurry filtration pressure as measured by the pressure sensor; (iv) $S_v$ is a particle surface area; (v) L is a cake thickness of a cake layer; and (vi) μ is a viscosity of the dispersion medium.

Additionally, the control system can estimate a second characteristic of the slurry using the cake particle packing fraction. For example, the second characteristic of the slurry can be a particle agglomerate diameter.

In one embodiment, the control system estimates the particle agglomerate diameter of the slurry using the following formula:

$$D_{aggl} = \sqrt{\frac{\frac{\emptyset_{RCP}^2}{(1-\emptyset_{RCP})^3}}{\frac{\emptyset_C^2}{(1-\emptyset_C)^3}}} D_{part},$$

wherein (i) $D_{aggl}$ is the particle agglomerate diameter of the slurry; (ii) $Ø_{RCP}$ is a random close packing cake particle packing fraction; (iii) $D_{part}$ is a nominal particle size of the particles; and (iv) Øc is the cake particle packing fraction of the slurry.

In another embodiment, the present invention is directed to a method for estimating a first characteristic of a slurry that includes a plurality of particles suspended in a dispersion medium. The method can include directing the slurry at a slurry filter that filters the slurry; and estimating the first characteristic of the slurry using a flow rate of a filtrate through the filter and a slurry filtration pressure of the slurry.

In one embodiment, the invention is directed to a manufacturing assembly that includes the slurry analysis system. In another embodiment, the invention is directed to a slurry source that includes the slurry analysis system.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
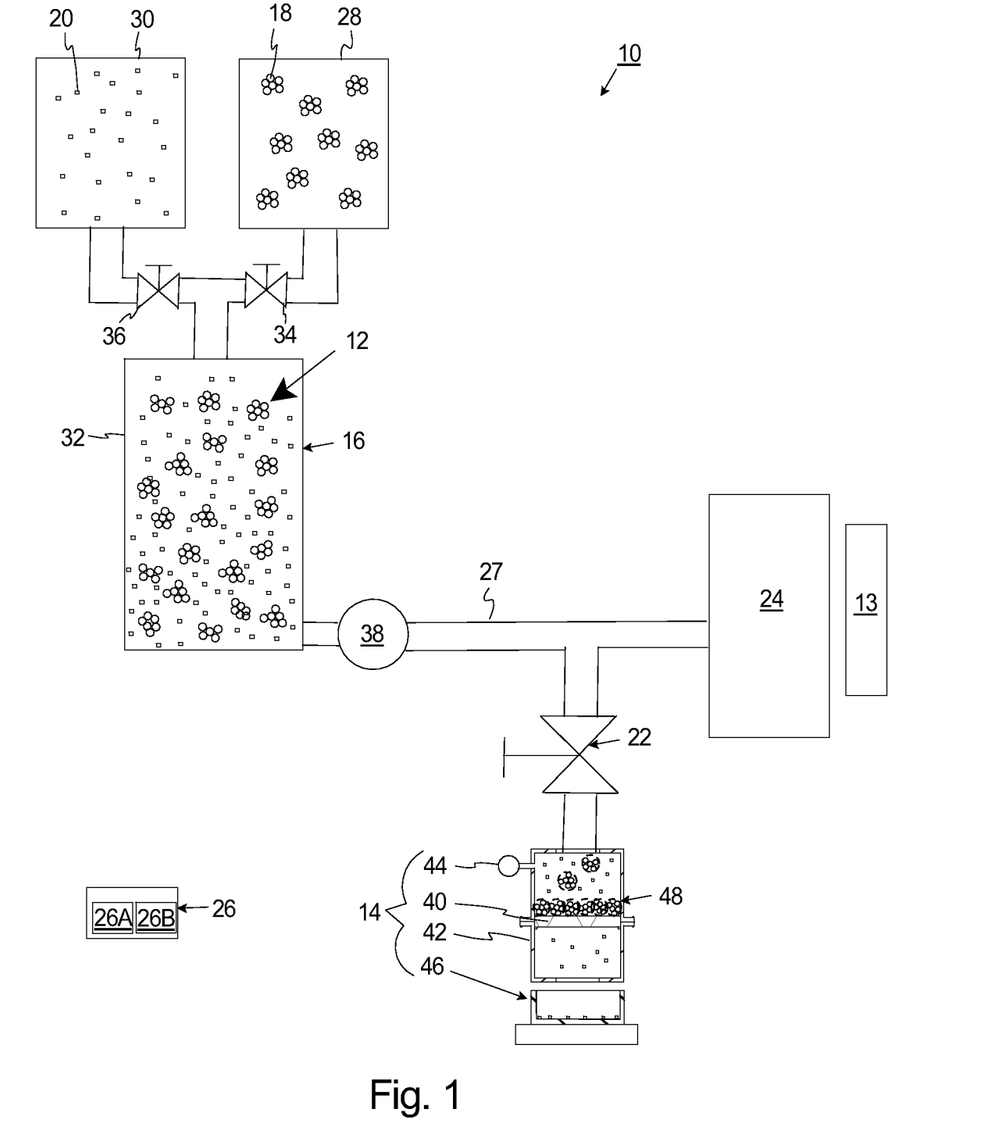
FIG. 1 is a simplified illustration of a manufacturing assembly having features of the present invention.

FIG. 1 is a simplified illustration of a manufacturing assembly 10 that uses a slurry 12 (illustrated in phantom (lines with dashes)) for manufacturing an object 13 (illustrated as a box and sometimes referred to as a workpiece). In many manufacturing assemblies 10 that use a slurry 12, the composition of the slurry 12 can significantly influence the quality of the manufactured object 13. As an overview, in FIG. 1, the manufacturing assembly 10 includes a unique slurry analysis system 14 (illustrated in cut-away) that accurately monitors and estimates one or more characteristics of the slurry 12. With this information, for example, the composition of the slurry 12 and/or the manufacturing assembly 10 can be adjusted as necessary to achieve the desired characteristics of the object 13. For example, with the improved monitoring capability of the slurry analysis system 14, a slurry source 16 of the slurry 12 can be readily adjusted and controlled so as to realize the desired performance. As a result thereof, the slurry analysis system 14 can be used to improve product quality management and control, manufacturing efficiency and cost.

Further, the slurry analysis system 14 provided herein can analyze the properties of the slurry 12 at ready-to-use conditions, and without diluting the slurry 12. This greatly simplifies the analysis and enables accurate monitoring of slurry 12 as well as processes for fluid synthesis. Moreover, the slurry analysis system 14 can use a generic scale to quantitatively compare a variety of slurries 12 and its processes.

The type of slurry 12 used can be varied to suit the requirements of the manufacturing assembly 10. In certain embodiments, the slurry 12 includes a plurality of particles 18 (illustrated with small circles) suspended in a dispersion medium 20 (illustrated with small squares). With this design, the properties of the particles 18 and the dispersion medium 20 can be varied to suit the requirements of the manufacturing assembly 10.

For example, the slurry 12 can be an abrasive slurry 12 that is used in the polishing of the object 13. In this design, the size, shape and the material of the particles 18 and the composition of the dispersion medium 20 can be selected to achieve the desired properties of the abrasive slurry 12. For example, the chemical composition of the dispersion medium 20 can alter the surface properties of the object 13, soften the object 13, and make it amenable to material removal. Further, the size and shape of the abrasive particles 18 influence the material removal from the surface of the object 13.

As another non-exclusive example, the slurry 12 can be a ceramic casting slurry that is used to form the object 13. Similar to the example above, the size, shape and the material of the particles 18 and the composition of the dispersion medium 20 can be selected to achieve the desired properties of the ceramic casting slurry 12.

As non-exclusive examples, the particles 18 can be made of ceramic materials, solid crystals, solid metals or solid polymers. Further, as non-exclusive examples, the dispersion medium 20 can be a liquid such as deionized water, water-based solution of various solutes, organic solvent, or another type of liquid.

The design of the manufacturing assembly 10 can be varied to suit the type of object 13 that is being manufactured. In the simplified, non-exclusive example illustrated in FIG. 1, the manufacturing assembly 10 includes the slurry source 16, a diversion valve 22, a manufacturing system 24 (illustrated as a box), a control system 26, and the slurry analysis system 14. Alternatively, the manufacturing assembly 10 can include more or fewer components than illustrated in FIG. 1. For example, the slurry analysis system 14 can be used with the slurry source 16 without the manufacturing system 24.

In the embodiment illustrated in FIG. 1, the manufacturing assembly 10 also includes one or more fluid conduits 27 that connect the various components in fluid communication with each other.

The slurry source 16 provides the slurry 12 to the manufacturing assembly 10. In the non-exclusive example illustrated in FIG. 1, the slurry source 16 includes (i) a particle receptacle 28 that retains the particles 18, (ii) a medium receptacle 30 that retains the dispersion medium 20, (iii) a mixing receptacle 32 that mixes the particles 18 and the dispersion medium 20 to create the slurry 12, (iv) a particle valve 34 that selectively controls the amount of particles 18 that are added to the mixing receptacle 32, and (v) a medium valve 36 that selectively controls the amount of dispersion medium 20 that is added to the mixing receptacle 32. With this design, the control system 26 can selectively control the valves 34, 36 to selectively control the composition of the slurry 12.

In an alternative embodiment, the slurry 12 is premixed and provided to the slurry analysis system 14 and/or the manufacturing system 24 without the particle receptacle 28 and the medium receptacle 32.

Additionally, the slurry source 16 can include one or more fluid pumps 38 that provide pressurized slurry 12 to the manufacturing system 24 and/or the slurry analysis system 14.

The diversion valve 22 is used to selectively divert some of the slurry 12 to the slurry analysis system 14. For example, the diversion valve 22 can be a valve that is manually controlled or electronically controlled by the control system 26 to selectively divert some of the slurry 12 for analysis by the slurry analysis system 14.

The type of manufacturing system 24 can be varied. In one, non-exclusive embodiment, the manufacturing system 24 is a polishing assembly that uses an abrasive slurry 12 to polish the object 13. In an alternative, non-exclusive example, the manufacturing system 24 is a casting system that injects a ceramic casting slurry 12 into a mold to form the object 13.

The control system 26 controls one or more of the components of the manufacturing assembly 10. Additionally, or alternatively, the control system 26 can use information from the slurry analysis system 14 to monitor and estimate one or more characteristics of the slurry 12. For example, the control system 26 can include one or more processors 26A (only one is illustrated as a box) and one or more electronic storage devices 26B (only one is illustrated as a box).

In the non-exclusive embodiment in FIG. 1, the control system 26 is illustrated as a centralized system. Alternatively, for example, the control system 26 can be a distributed system with a separate processor used as part of the slurry analysis system 14 to calculate the one or more characteristics of the slurry 12. Still alternatively, the control system 26 can be a separate computer or processor, such as a laptop.

The slurry analysis system 14 collects information that is used for estimating one or more characteristics of the slurry 12. In the non-exclusive example illustrated in FIG. 1, the slurry analysis system 14 includes a slurry filter 40, a filter housing 42, a pressure sensor 44, and a flow sensor 46. The design of each of these components can be varied. Further, the slurry analysis system 14 can include more or fewer components than are illustrated in FIG. 1.

Figure 2:
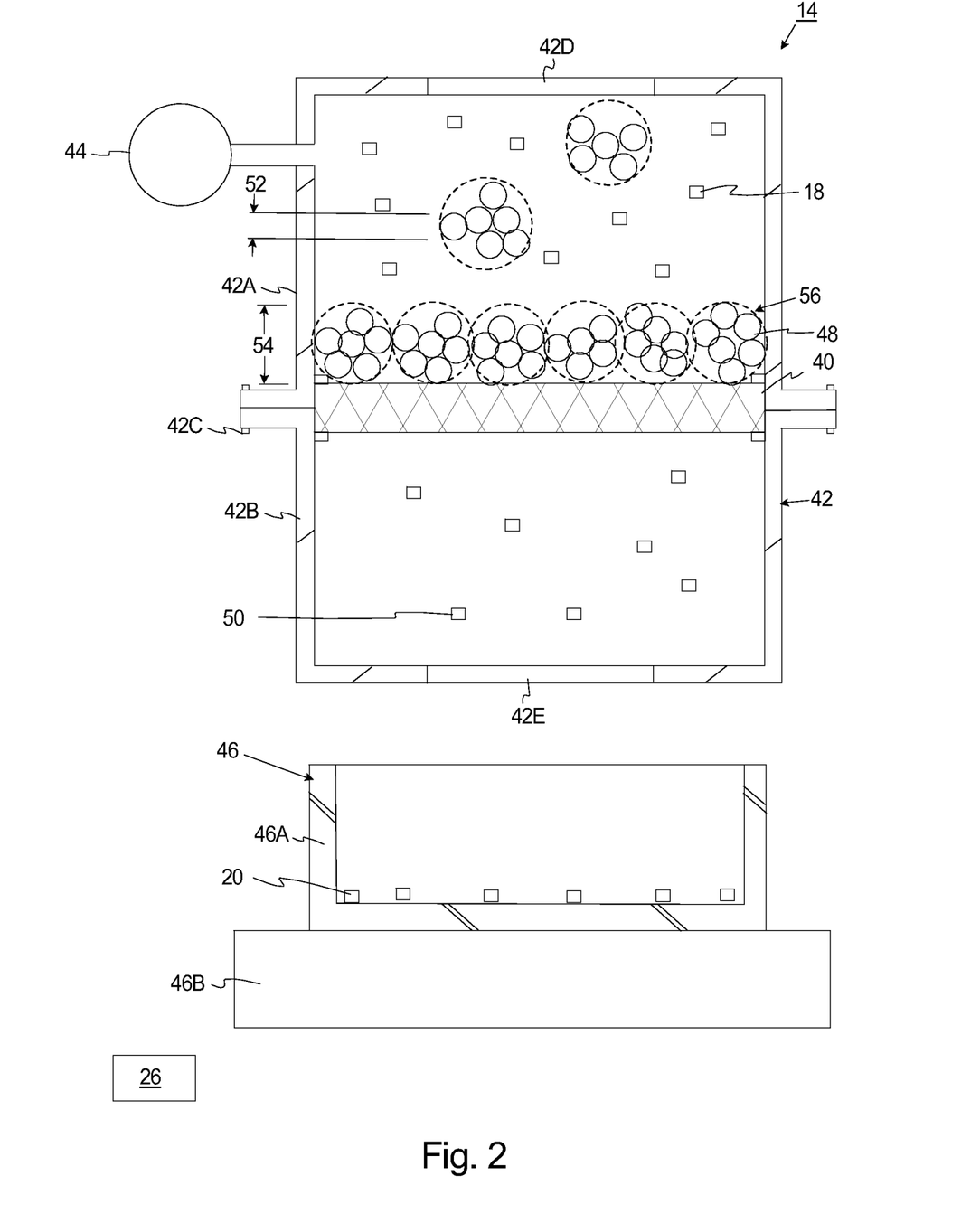
FIG. 2 is a simplified illustration of a slurry analysis system of the manufacturing assembly of FIG. 1.

FIG. 2 is an enlarged cut-away view of the slurry analysis system 14 including the slurry filter 40, the filter housing 42, the pressure sensor 44, the flow sensor 46, and the control system 26. As an overview, the slurry analysis system 12 can determine the one or more characteristics of the slurry 12 by directing the slurry 12 at the slurry filter 40 to form the sediment 48 of the particles 18 above the slurry filter 40. In this embodiment, the control system 26 can estimate one or more characteristics of the slurry 12 using (i) a flow rate of a filtrate 50 through the slurry filter 40, (ii) a slurry filtration pressure of the slurry 12, (iii) a nominal particle property, e.g. a nominal particle size 52 (e.g. particle diameter) of the particles 18 or a nominal particle surface area of the particles 18; (iv) a cake thickness 54 of a cake layer 56 against the slurry filter 40; and (v) a viscosity of the filtrate 50 (e.g. the dispersion medium 20).

The slurry filter 40 filters the slurry 12 to create the cake layer 56. The properties of the slurry filter 40 are selected to correspond to the properties of the slurry 12. In one non-exclusive embodiment, the slurry filter 40 is a filter that passes the dispersion medium 20 and blocks the particles 18. In FIG. 2, the slurry filter 40 is a disk shaped, membrane filter. Alternatively, the slurry filter 40 can have another configuration. As a non-exclusive example, the slurry filter 40 can have approximately five micron pores. However, other sizes and designs are possible.

The filter housing 42 retains the slurry filter 40. In the non-exclusive embodiment illustrated in FIG. 2, the filter housing 40 is rigid, generally hollow cylindrical shaped. Alternatively, the filter housing 42 can have another configuration.

In one embodiment, the filter housing 42 includes a transparent region (or is completely transparent) to allow for the measuring of the cake thickness 54 through the filter housing 42. Further, the filter housing 42 can include tape measure markings (not shown) that facilitate the measuring of the cake thickness 54. Alternatively, for example, the slurry filter 40 can be removed from the filter housing 42 to allow for the direct measurement of the cake thickness 54 using a tape measure or other device.

Further, the filter housing 42 can be separable to allow the slurry filter 40 to be installed and/or removed. In the non-exclusive embodiment illustrated in FIG. 2, the filter housing 42 includes a first housing part 42A, a second housing part 42B, and one or more housing attachers 42C (e.g. bolts) that can be used to selectively attach the housing parts 42A, 42B. In this embodiment, the housing parts 42A, 42B cooperate to selectively retain the slurry filter 40.

It should be noted that the filter housing 42 can include a filter inlet 42D in which the slurry 12 is directed into the filter housing 42 and a filter outlet 42E in which the filtrate 50 exits the filter housing 42.

The pressure sensor 44 measures the slurry filtration pressure of the slurry 12 before the slurry filter 40. In this embodiment, the pressure sensor 44 measures the pressure in the filter housing 42 above and near the slurry filter 40, and near the filter inlet 42D.

It should be noted that in FIG. 1, the pressure of the slurry 12 above the slurry filter 40 is provided by the pump 38. Alternatively, a separate air pump or other type of pump can be used to apply a substantially constant pressure to the slurry 12 above the slurry filter 40. As a non-exclusive example, the constant pressure can be approximately ten pounds per square inch.

The flow sensor 46 measures the flow of the filtrate 50 through the slurry filter 40. The design of the flow sensor 46 can vary. In the non-exclusive embodiment illustrated in FIG. 2, the flow sensor 46 includes a filtrate receptacle 46A that collects the filtrate 50 that exits the filter outlet 42E and a scale 46B that weights the filtrate 50 that has passed through the slurry filter 40. With this design, the weight of the filtrate 50 that has passed through the slurry filter 40 can be used to calculate the flow rate of the filtrate 50.

In one embodiment, a first characteristic of the slurry 12 that is estimated with the control system 26 is a cake particle packing fraction of the slurry 12. As used herein, the term cake particle packing fraction shall mean the volumetric density of the particles 18 in the cake layer 56, and represents the volume percentage of the cake layer 56 that is made up of the particles 18

In this embodiment, the control system 26 can estimate the cake particle packing fraction using (i) the flow rate of the filtrate 50 through the slurry filter 40, (ii) the slurry filtration pressure of the slurry 12, (iii) the nominal particle property, e.g. the nominal particle size 52 of the particles 18 or the nominal particle surface area of the particles 18; (iv) the cake thickness 54 of the cake layer 56 against the slurry filter 40; and (v) the viscosity of the dispersion medium 20.

For example, (i) the flow rate of the filtrate 50 can be determined with the flow sensor 46, (ii) the slurry filtration pressure can be determined with the pressure sensor 44, (iii) the nominal particle size 52 can be measured by measuring a diameter of the particles 18; (iv) the nominal particle surface area of the particles 18 can be calculated using the diameter (e.g. particle surface area=six/particle diameter); (v) the cake thickness 54 of the cake layer 56 can be measured; and (vi) the viscosity of the dispersion medium 20 can be measured or looked up.

Subsequently, using the cake particle packing fraction, the control system can estimate a second characteristic of the slurry 12. For example, the second characteristic can be a particle agglomerate diameter. As used herein, the term particle agglomerate diameter shall mean a diameter of the particle agglomerate.

The formula used by the control system 26 to calculate the cake particle packing fraction and the particle agglomerate diameter can be varied.

In one embodiment, the formula used by the control system 26 to estimate the cake particle packing fraction can be expressed as follows:

$$\frac{\phi_c^2}{(1-\phi_c)^3} = \frac{P}{SS_v^2 \mu} \frac{dt}{dV} \frac{1}{L}. \qquad \text{Equation (1)}$$

In Equation (1) and elsewhere (i) Øc is the cake particle packing fraction of the slurry 12; (ii)

$$\frac{dt}{dV}$$

is the inverse of the flow rate of the filtrate 50 through the slurry filter 40 and the cake layer 56; (iii) P is the slurry filtration pressure as measured by the pressure sensor 44, (iv) $S_v$ is the particle surface area; (v) L is the cake thickness 54 of the cake layer 56; and (vi) μ is the viscosity of the filtrated 50 (e.g. dispersion medium 20). In one embodiment, the particle surface area is selected to be equal to six divided by the nominal particle diameter 52 ($S_v=6/D_{Part}$).

Subsequently, after calculating the cake particle packing fraction, the control system 26 can estimate the particle agglomerate diameter.

In one embodiment, the formula used by the control system 26 to estimate the particle agglomerate diameter can be expressed as follows:

$$D_{aggl} = \sqrt{\frac{\frac{\phi_{RCP}^2}{(1-\phi_{RCP})^3}}{\frac{\phi_C^2}{(1-\phi_C)^3}}} D_{part}. \qquad \text{Equation (2)}$$

In Equation (2) and elsewhere (i) $D_{aggl}$ is the particle agglomerate diameter; (ii) $Ø_{RCP}$ is the random close packing cake particle packing fraction; and (iii) $D_{part}$ is the nominal particle size 52 of the particles.

With the information regarding the cake particle packing fraction and the particle agglomerate diameter, the composition of the slurry 12 can be adjusted as necessary to achieve the desired characteristics of the object 13. For example, in a polishing procedure if the particle agglomerate diameter is too large, the resulting object may contain scratches.

Further, with the present system and method, the properties of the slurry 12 are analyzed at ready-to-use conditions, and without diluting the slurry 12. This greatly simplifies the analysis and enables accurate monitoring of slurry 12 as well as processes for fluid synthesis.

Stated in another fashion, the slurry analysis system 14 solves the problem of conventional fluid monitoring methods requiring pre-manipulation of the monitored slurry 12 that alters its properties before being measured. The slurry analysis system 14 monitors the slurry 12 without pre-manipulation, under original conditions (e.g. high concentration) of important product feature ingredients of the slurry 12 (e.g. slurry particles). It also provides parameterizations of the key properties of the slurry 12 (e.g. particle agglomeration, particle sediment (cake) density).

A key strategy of monitoring the slurry 12 is to first obtain measurements of the macroscopic properties of the slurry 12, such as fluid flow and pressure while the slurry 12 goes through a certain process, e.g. filtering. The measurements are then combined using theoretical models and pre-acquired knowledge pertaining to the monitored slurry 12 and its undergoing process, so that the key properties of the slurry 12 can be measured under the original conditions of the slurry 12.

Further, the slurry analysis system provided herein is relatively inexpensive to manufacture and operate.

Figure 3A:
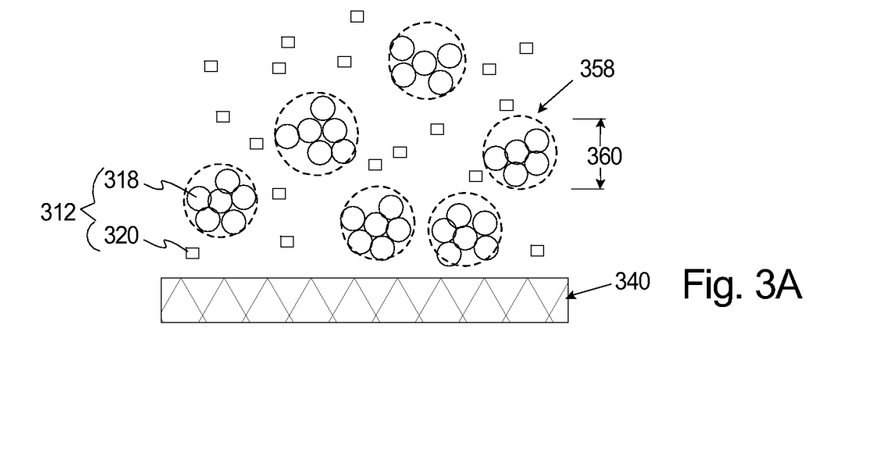
FIG. 3A is a simplified illustration of a slurry filter with a first slurry prior to being directed at the slurry filter.

The following paragraphs provide an explanation of how Equations 1 and 2 were calculated. FIG. 3A is a simplified illustration of the slurry filter 340 with a first slurry 312 including particles 318 and dispersion medium 320 prior to being directed at the slurry filter 340. In this example, the first slurry 312 has a first pH level (e.g. a pH level of four) and the particles 318 agglomerate to form a plurality of particle agglomerates 358, with each particle agglomerate 358 being made up of multiple particles 318 connected together.

It should be noted that the size of each of the particle agglomerates 358 will depend upon the properties of the first slurry 312. In FIG. 3A, each particle agglomerate 358 will have a particle agglomerate diameter 360 ("$D_{aggl}$").

Figure 3B:
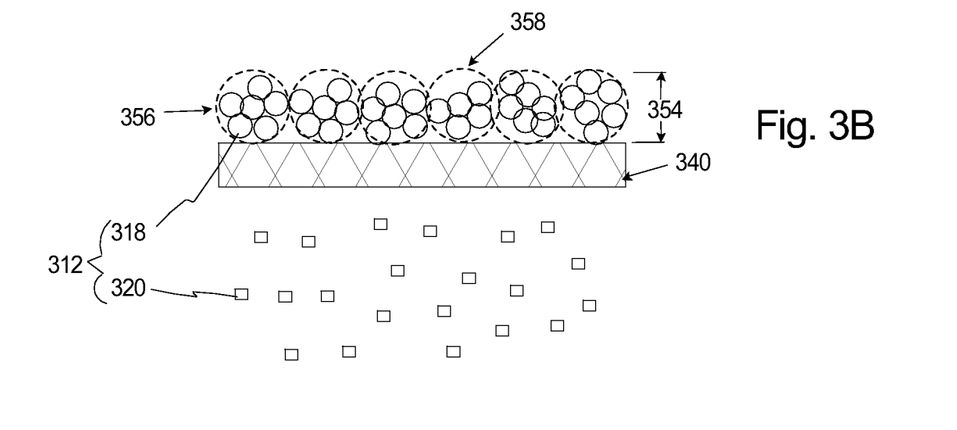
FIG. 3B is a simplified illustration of the slurry filter after the first slurry is directed at the slurry filter.

FIG. 3B is a simplified illustration of the slurry filter 340 after the dispersion medium 320 of the first slurry 312 has passed through the slurry filter 340. In this example, the particles 318 are still agglomerated, and the plurality of particle agglomerates 358 form the cake layer 356 having the cake thickness 354.

Figure 4A:
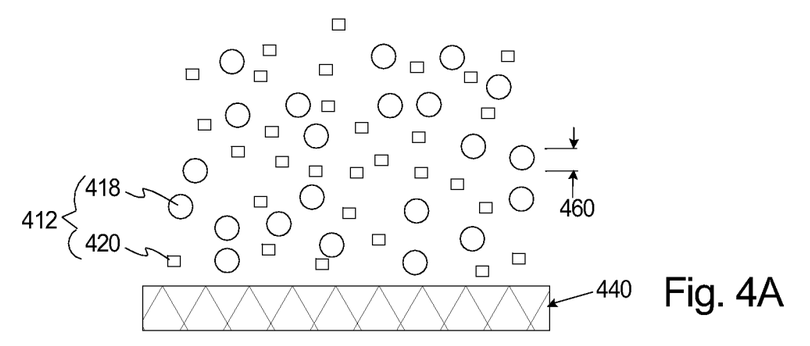
FIG. 4A is a simplified illustration of the slurry filter with a second slurry prior to being directed at the slurry filter.

FIG. 4A is a simplified illustration of the slurry filter 440 with a second slurry 412 including particles 418 and dispersion medium 420 prior to being directed at the slurry filter 440. In this example, the second slurry 412 is the same as the first slurry 312, except the second slurry has a higher, second pH level (e.g. a pH level of ten). In this simplified example, the particles 418 tend not to agglomerate at the second pH level for this slurry 412. Thus, the particle agglomerate diameter 460 ("$D_{aggl}$") will be approximately equal to the diameter of the particles 418.

Figure 4B:
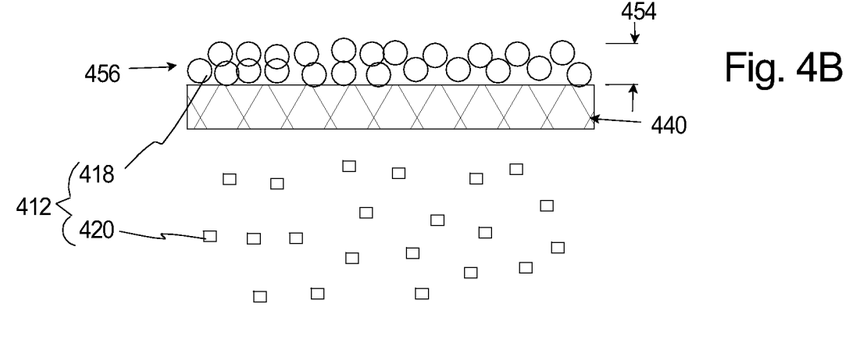
FIG. 4B is a simplified illustration of the slurry filter after the second slurry is directed at the slurry filter.

FIG. 4B is a simplified illustration of the slurry filter 440 after the dispersion medium 420 of the second slurry 412 has passed through the slurry filter 440. In this example, the plurality of particles 418 form the cake layer 456 having the cake thickness 454. Further, the slurries 312, 412 will have different cake particle packing fractions.

In this example, comparing FIGS. 3B and 4B, the size of the particle agglomerates 358, and the cake thickness 354, 454 will depend and vary according to the pH level of the slurry 312, 412.

As a non-exclusive example, the first and second slurries 312, 412 can be a silica glass nanoparticle slurry. Silica particles are known to behave differently in high-concentration slurries prepared with different pH conditions. The silica particles tend to form agglomerates at low pH whereas the particles are more individually separated at high pH.

The Kozeny-Carmen Equation can be used to calculate the pressure drop of a fluid flowing through a packed bed of solids. The Kozeny-Carmen Equation can be expressed as follows:

$$\frac{P}{SS_v^2 \mu} \frac{dt}{dV} = \frac{\phi c^2}{(1-\phi c)^3} \phi_c L.$$ Equation (3)

Further, Equation (3) can be rewritten as provided below to correspond filtration pressure and flow rate:

$$\frac{P}{\left(\frac{dV}{dt}\right)} = 5 S_v^2 \mu \frac{\phi c^2}{(1-\phi c)^3} \phi c L.$$ Equation (4)

As provided herein, the resistance in the filter increases as (i) the particle surface area $S_v$ increases; (ii) as the viscosity (μ) of the dispersion medium increases, (iii) as the cake particle packing fraction (Øc) increases (e.g. nears one), and (iv) as the cake thickness L increases.

Further, Equation 3 can be rewritten to solve for the cake particle packing fraction (Øc) as provided in Equation 1. As a result thereof, the cake packing fraction (Øc) can be derived by solving the Kozeny-Carman equation with available monitoring settings and measurements.

Subsequently, the cake packing fraction (Øc) can be used to calculate the particle agglomerate diameter 460 ("$D_{aggl}$").

Figure 5:
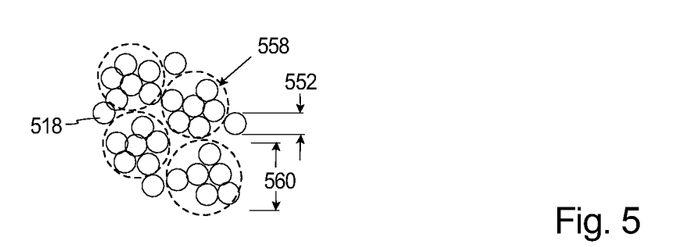
FIG. 5 is a simplified illustration of a plurality of particle agglomerates.

FIG. 5 is a simplified illustration of a plurality of particles 518 that have formed a plurality of particle agglomerates 558. In FIG. 5, the particle agglomerates 558 each have a particle agglomerate diameter 560 and each particle 518 has a nominal particle size (diameter) 552.

As primary particles 512, the packing fraction may be somewhat low. However, as particle agglomerates 558, the particles are closely packed. Stated in a different fashion, it is assumed that in a cake layer, the particles 512 may be gathered up in a rather sparse manner but as particle agglomerates 558 they are packed as densely as possible. Each of the particle agglomerates 558, as clusters of primary particles 512, can be approximated as a sphere having the particle agglomerate diameter 560 ("$D_{aggl}$").

The present invention proposes the use of a hypothetical model of random close packing to facilitate the calculation of the particle agglomerate diameter 560. More specifically, spheres of approximately the same diameter will have a random close packing particle packing fraction. For example, as provided herein a random close packing cake particle packing fraction of a plurality of spheres can a value of approximately 0.64 ($Ø_{RCP}$=~0.64). Stated in another fashion, for a packing structure of the agglomerates, it is fair to consider random close packing (RCP), a non-crystalline packing configuration known for its packing fraction $Ø_{RCP}$ of about 0.64 that characterizes the maximum dense packing except for a few crystalline structures. It should be noted that other values for the random close packing cake particle packing fraction can be utilized.

Subsequently, a particle agglomeration model is then applied to further derive the particle agglomerate diameter 560.

As provided herein, Equation (3) can be rewritten for the situation of random close packing as follows:

$$\frac{P}{SS_{v,aggl}^2 \mu} \frac{dt}{dV} = \frac{\phi_{RCP}}{(1-\phi_{RCP})^3} \phi_{RCL} L$$ Equation (5)

In Equation (5) and elsewhere, $S_{v,aggl}$ is the surface area the particle agglomerate. In one implementation, the particle surface area is defined to be equal to six divided by the particle agglomerate diameter ($S_{v,aggl}$=6/$D_{aggl}$).

Next, it is assumed that the filtration cake, treated here as a bulk of gathered-up agglomerates, follows another Kozeny-Carman equation for a sphere particle of diameter $D_{aggl}$ under filtration. Then, the particle agglomeration model equation is derived based on (i) the derived cake particle packing fraction of the actual cake layer ($Ø_c$), (ii) the random close packing particle packing function ($Ø_{RCL}$), and (iii) the nominal particle diameter of the particles ($D_{part}$).

More specifically, Equations (4) and (5) can be combined as follows:

$$5 * \left(\frac{6}{D_{aggl}}\right)^2 \mu \frac{\phi_{RCP}^2}{(1-\phi_{RcP})^3} L = 5 * \left(\frac{6}{D_{part}}\right)^2 \mu \frac{\phi_C^2}{(1-\phi_C)^3} L.$$ Equation (6)

Next, Equation 6 can be manipulated to solve for the particle agglomerate diameter as provided above in Equation 2.

The particle agglomeration model in Equation 2 above can be readily applied with (i) the derived cake particle packing fraction packing fraction ($Ø_c$) determined with Equation (1); (ii) the random close packing particle packing function ($Ø_{RCL}$), and (iii) the nominal particle diameter of the particles ($D_{part}$) to determine particle agglomerate diameter ($D_{aggl}$).

Figure 6:
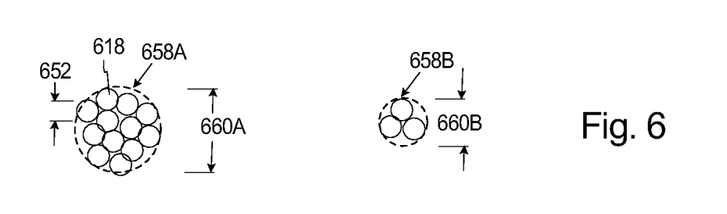
FIG. 6 illustrates a couple of different particle agglomerates.

FIG. 6 illustrates a couple of different particle agglomerates. More specifically, FIG. 6 illustrates (i) a first particle agglomerate 658A having a first particle agglomerate diameter 660A from a first slurry; and (ii) a second particle agglomerate 658B having a second particle agglomerate diameter 660B from a second slurry. In this embodiment, each particle agglomerate 658A, 658B is made up of a plurality of particles 618, with each particle 618 having a similar, nominal particle diameter 652.

Moreover, in this example, each slurry is a silica slurry, and the pH level of the first slurry is lower than the pH level of the second slurry. As a result thereof, (i) the first particle agglomerate 658A includes more particles 618 than the second particle agglomerate 658B, and (ii) the first particle agglomerate diameter 660A is larger than the second particle agglomerate diameter 660B.

The slurry analysis system and method was used to estimate the agglomerate diameters for a set of silica slurries with pH from 3.86 to 10.06. In these tests, each slurry was silica particles 20 wt %, the slurry filtration pressure was 70 kPa, and the slurry filter was a five micron filter. Table 1 below illustrates the results. As illustrated in Table 1, there is a clear trend that agglomeration becomes more evident as pH becomes lower. More importantly, particle agglomerate diameter ($D_{aggl}$) gives a quantitative parameter of particle agglomeration in a slurry at a high particle concentration, serving as a useful scale of measure enabling apple-to-apple comparisons across a variety of slurries. That is, a slurry with a larger particle agglomerate diameter is deemed to consist of particles that have more tendency to agglomerate when dispersed in a dispersion medium than a slurry with a smaller particle agglomerate diameter. This is important especially when the monitored slurry has not been diluted for monitoring purposes because such a dilution will affect the agglomeration of the particles before any monitoring can be done.

TABLE 1

| pH | $\emptyset_C$ | $D_{aggl}$ | $D_{aggl}/D_{part}$ | $D_{part}$ |
|---|---|---|---|---|
| 3.86 | 0.345 | 500 nm | 4.54 | 110 nm |
| 4.51 | 0.449 | 298 nm | 2.71 | 110 nm |
| 7.19 | 0.492 | 240 nm | 2.18 | 110 nm |
| 8.04 | 0.498 | 233 nm | 2.12 | 110 nm |
| 9.03 | 0.480 | 255 nm | 2.32 | 110 nm |
| 10.06 | 0.491 | 241 nm | 2.19 | 110 nm |

While the particular assembly as shown and disclosed herein is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A slurry analysis system for estimating one or more characteristics of a slurry that includes a plurality of particles suspended in a dispersion medium, the slurry analysis system comprising:

a slurry filter that filters the slurry; and a control system that (i) estimates a first characteristic of the slurry using a flow rate of a filtrate through the filter and a slurry filtration pressure of the slurry, wherein the first characteristic is a cake particle packing fraction of the slurry; and (ii) estimates a second characteristic of the slurry using a hypothetical model of random close packing, the second characteristic of the slurry being a particle agglomerate diameter; wherein the control system estimates the second characteristic of the slurry also using the cake particle packing fraction;

wherein the control system estimates the particle agglomerate diameter of the slurry using the following formula:

$$D_{aggl} = \sqrt{\frac{\frac{\emptyset_{RCP}^2}{(1-\emptyset_{RCP})^3}}{\frac{\emptyset_C^2}{(1-\emptyset_C)^3}}} D_{part}$$

wherein (i) $D_{aggl}$ is the particle agglomerate diameter of the slurry; (ii) $\emptyset_{RCP}$ is a random close packing cake particle packing fraction; (iii) $D_{part}$ is a nominal particle size of the particles; and (iv) $\emptyset c$ is the cake particle packing fraction of the slurry.

2. The slurry analysis system of claim 1 wherein the slurry filter passes the dispersion medium and blocks the particles.

3. The slurry analysis system of claim 1 wherein the control system estimates the first characteristic of the slurry also using a nominal particle property of the particles.

4. The slurry analysis system of claim 1 wherein the control system estimates the first characteristic of the slurry also using a cake thickness of a cake layer against the filter.

5. The slurry analysis system of claim 1 wherein the control system estimates the first characteristic of the slurry also using a viscosity of the dispersion medium.

6. The slurry analysis system of claim 1 wherein the control system estimates the first characteristic of the slurry also using (i) a nominal particle property of the particles; (ii) a cake thickness of a cake layer against the filter; and (iii) a viscosity of the dispersion medium.

7. The slurry analysis system of claim 1 wherein the control system estimates the cake particle packing fraction of the slurry using the following formula:

$$\frac{\emptyset c^2}{(1-\emptyset c)^3} = \frac{P}{SS_v^2 \mu} \frac{dt}{dV} \frac{1}{L}$$

wherein (i) $\emptyset c$ is the cake particle packing fraction of the slurry; (ii)

$$\frac{dt}{dV}$$

is the inverse of the flow rate of the filtrate through the slurry filter; (iii) P is the slurry filtration pressure as measured by the pressure sensor; (iv) $S_v$ is a particle surface area; (v) L is a cake thickness of a cake layer; and (vi) µ is a viscosity of the dispersion medium.

8. The slurry analysis system of claim 1 wherein the control system calculates the cake particle packing fraction also using (i) a nominal particle property; (ii) a cake thickness of a cake layer against the filter; and (iii) a viscosity of the dispersion medium.

9. A manufacturing assembly that includes a manufacturing system, and the slurry analysis system of 1.

10. A slurry source that includes a receptacle that retains the slurry, and the slurry analysis system of claim 1.

11. A method for estimating one or more characteristics of a slurry that includes a plurality of particles suspended in a dispersion medium, the method comprising:

directing the slurry at a slurry filter that filters the slurry;

estimating a first characteristic of the slurry with a control system using a flow rate of a filtrate through the filter and a slurry filtration pressure of the slurry;

wherein the first characteristic is a cake particle packing fraction of the slurry, and the step of estimating the first characteristic includes using the following formula:

$$\frac{\emptyset c^2}{(1-\emptyset c)^3} = \frac{P}{SS_v^2 \mu} \frac{dt}{dV} \frac{1}{L}$$

wherein (i) $\emptyset c$ is the cake particle packing fraction of the slurry; (ii)

$$\frac{dt}{dV}$$

is the inverse of the flow rate of the filtrate through the slurry filter; (iii) P is the slurry filtration pressure as measured by the pressure sensor; (iv) $S_v$ is a particle surface area;

(v) L is a cake thickness of a cake layer; and (vi) µ is a viscosity of the dispersion medium; and estimating a second characteristic of the slurry with the control system using a hypothetical model of random close packing, the second characteristic of the slurry being a particle agglomerate diameter; wherein the step of estimating the second characteristic includes estimating the second characteristic of the slurry also using the cake particle packing fraction; wherein the step of estimating the second characteristic includes estimating the particle agglomerate diameter of the slurry using the following formula:

$$D_{aggi} = \sqrt{\frac{\frac{\phi_{RCP}^2}{(1-\phi_{RCP})^3}}{\frac{\phi_C^2}{(1-\phi_C)^3}}} D_{part}$$

wherein (i) $D_{aggi}$ is the particle agglomerate diameter of the slurry; (ii) $\emptyset_{RCP}$ is a random close packing cake particle packing fraction; (iii) $D_{part}$ is a nominal particle size of the particles; and (iv) $\emptyset c$ is the cake particle packing fraction of the slurry.

12. The method of claim 11 wherein the step of estimating the first characteristic includes also using a nominal particle property of the particles.

13. The method of claim 11 wherein the step of directing includes passing the dispersion medium and blocking the particles with the slurry filter.

* * * * *

UNITED STATES PATENT AND TRADEMARK OFFICE
CERTIFICATE OF CORRECTION

PATENT NO. : 11,921,025 B2
APPLICATION NO. : 17/616931
DATED : March 5, 2024
INVENTOR(S) : Takashi Nagata et al.

It is certified that error appears in the above-identified patent and that said Letters Patent is hereby corrected as shown below:

In the Claims

Column 11, Claim 1, Line 48, please delete:
"(i) $D_{aggi}$"

And insert:
-- (i) $D_{aggl}$ --

Column 12, Claim 7, Lines 9 and 10, delete:

" $\dfrac{\phi c^2}{(1-\phi c)^3} = \dfrac{P}{5S_v^2 \mu} \dfrac{dt}{dV} \dfrac{1}{L}$ ,, And insert:

-- $\dfrac{\phi c^2}{(1-\phi c)^3} = \dfrac{P}{5S_v^2 \mu} \dfrac{dt}{dV} \dfrac{1}{L}$ --

Column 12, Claim 11, Lines 46 and 47, delete:

" $\dfrac{\phi c^2}{(1-\phi c)^3} = \dfrac{P}{5S_v^2 \mu} \dfrac{dt}{dV} \dfrac{1}{L}$ ,, And insert:

-- $\dfrac{\phi c^2}{(1-\phi c)^3} = \dfrac{P}{5S_v^2 \mu} \dfrac{dt}{dV} \dfrac{1}{L}$ --

Signed and Sealed this
Ninth Day of April, 2024

Katherine Kelly Vidal
*Director of the United States Patent and Trademark Office*